United States Patent [19]

Kawabata

[11] Patent Number: 5,448,201
[45] Date of Patent: Sep. 5, 1995

[54] CLOCK RECOVERY CIRCUIT IN π/4 SHIFT QUADRIPHASE PSK DEMODULATOR

[75] Inventor: Hisashi Kawabata, Tokyo, Japan

[73] Assignee: NEC Corporation, Japan

[21] Appl. No.: 201,661

[22] Filed: Feb. 25, 1994

[30] Foreign Application Priority Data

Feb. 26, 1993 [JP] Japan .................................. 5-039023

[51] Int. Cl.6 .......................................... H04L 27/22
[52] U.S. Cl. .................... 329/304; 329/307; 375/329; 375/327; 375/331; 375/354
[58] Field of Search ............... 329/304, 306, 307, 346, 329/309, 310; 375/83, 84, 85, 86, 80, 80, 20, 97, 54, 118, 106; 331/23

[56] References Cited

U.S. PATENT DOCUMENTS

| | | | |
|---|---|---|---|
| 3,100,890 | 8/1963 | Henning | 332/104 |
| 3,883,806 | 5/1975 | De Long et al. | 329/346 |
| 4,027,265 | 5/1977 | Kobayashi et al. | 329/308 |
| 4,651,108 | 3/1987 | Okita et al. | 329/309 |
| 4,809,301 | 2/1989 | Rhodes | 375/87 |
| 4,896,336 | 1/1990 | Henely et al. | 329/308 X |
| 5,025,455 | 6/1991 | Nguyen | 375/81 |
| 5,179,578 | 1/1993 | Ishizu | 375/86 |

FOREIGN PATENT DOCUMENTS

0322766 12/1988 European Pat. Off.

OTHER PUBLICATIONS

Otani, Susumu et al., "Development of Variable-Rate Digital Modem for Digital Satellite Communication Systems", I.E.E.E., 1988, pp. 0148-0152.

*Primary Examiner*—Robert J. Pascal
*Assistant Examiner*—Arnold Kinkead
*Attorney, Agent, or Firm*—Ostrolenk, Faber, Gerb & Soffen

[57] ABSTRACT

A clock recovery circuit having a feedback system in a π/4 shift QPSK demodulator, comprising a signal state transition detector for detecting state transitions between consecutive symbols of the demodulated baseband signal which is formed from the detected baseband signal by π/4 reverse shifting. According to degree of the detected symbol state transition, the ½-symbol delayed baseband signal is shifted by the amount of π/8 in phase. According to direction of the detected symbol state transition, the π/8 phase shifted baseband signal is converted into an error signal in use for the feedback system. An oscillator generates a clock signal of a frequency controlled by the error signal such that the error signal is reduced in the feedback system.

9 Claims, 7 Drawing Sheets

π/4 SHIFT QPSK

CLOCK RECOVERY CIRCUIT IN π/4 SHIFT QUADRIPHASE PSK DEMODULATOR

FIELD OF THE INVENTION

The present invention relates to a circuit for recovering a clock signal in a digital demodulator, and in particular, to a clock recovery circuit in a QPSK (Quadriphase Phase Shift Keying) demodulator for digital communication systems.

BACKGROUND OF THE INVENTION

In digital communications by means of satellites, QPSK is generally used to modulate a carrier wave according to a digital baseband signal. On the receive side, the baseband signal is recovered from the received QPSK modulated carrier wave by a QPSK demodulator. In such a QPSK demodulator, clock recovery is a very important technology to obtain accurate symbol identification. For this accurate clock recovery, various circuits have been proposed.

Figure 1:
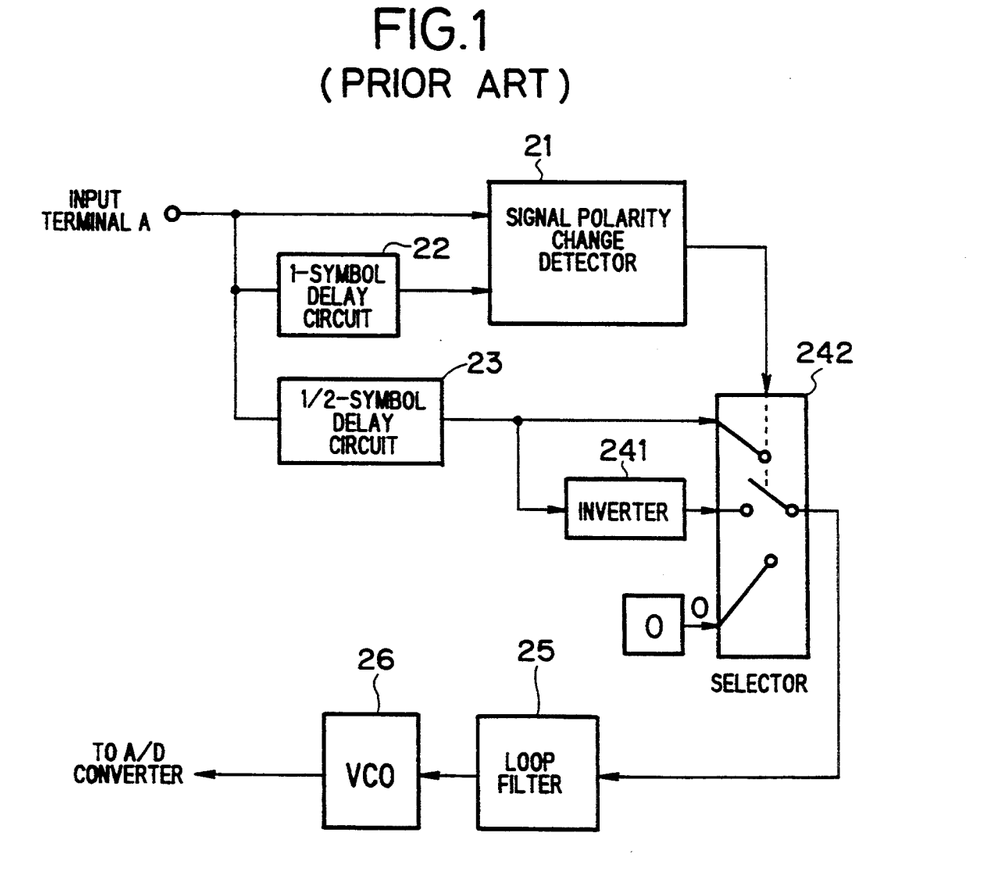
FIG. 1 is a block diagram illustrating a conventional QPSK clock recovery circuit.

FIG. 1 shows an example of a conventional clock recovery circuit in a QPSK demodulator. Here, assuming that the demodulated baseband signal $D(n)$ corresponding to one of I channel and Q channel is input to an input terminal A and the QPSK demodulator operates at a sampling frequency N-times the symbol rate ($N=2k$; where $k=1, 2, \ldots$). A signal polarity change detector 21 detects the polarity change of the input signal from the demodulated baseband signal $D(n)$ and the output $D(n-N)$ of a one-symbol delay circuit 22 to make a selector 242 work.

When there is a change in signal polarity, it is estimated that the signal $D(n-N/2)$ which is an output of a ½ symbol delay circuit 23 was a near-zero value. Therefore, by using this near-zero value as the amount of deviation from zero, a Phase-Locked Loop (PLL) circuit for controlling the phase of the sampling clock is formed, thereby implementing $D(n-N/2)=0$ and allowing the output of VCO (Voltage Controlled Oscillator) to be synchronized with the zero-cross point of the demodulated baseband signal, that is, clock recovery is carried out.

Figure 2:
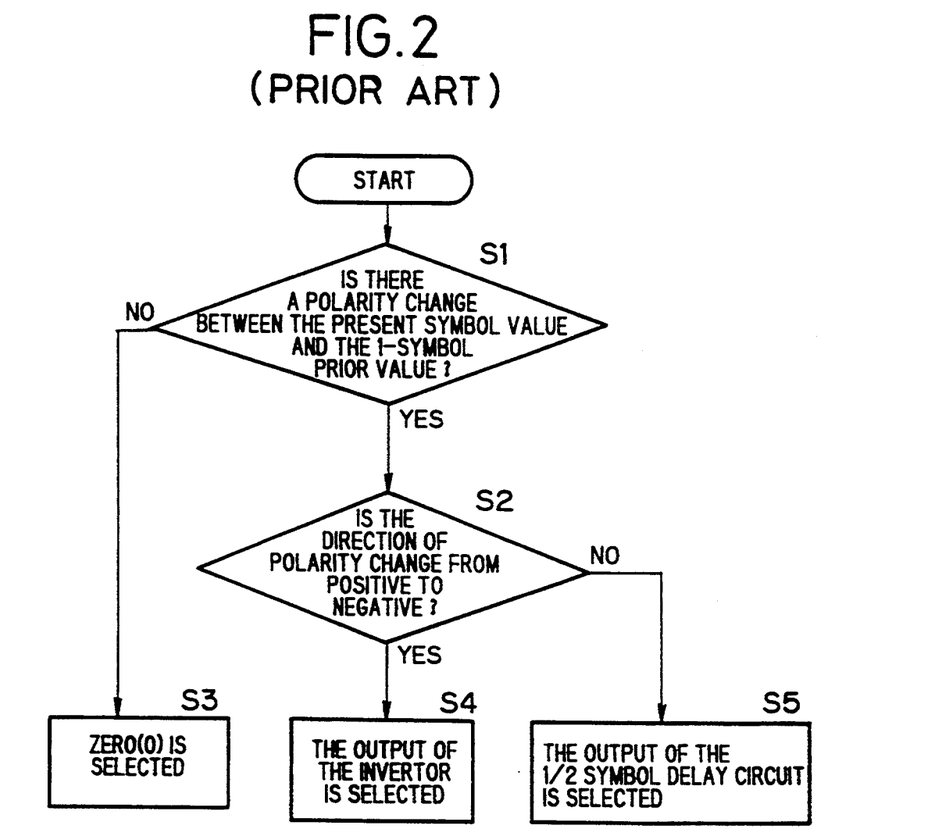
FIG. 2 is a flowchart showing the operation of the signal polarity change detector in the conventional QPSK clock recovery circuit of FIG. 1.

The operation of the signal polarity change detector 21 is explained with reference to the flowchart in FIG. 2. First, in step S1, it determines whether there is a polarity change or not. That is, the presence or absence of polarity change is detected from $D(n)$ and $D(n-N)$. If there is a polarity change, it means that there was a zero-cross point from one symbol prior and on. Moreover, it can be guessed that the value of $D(n-N/2)$ is a near-zero value which can be taken as the amount of deviation from zero. The relationship between the deviation direction of the sampling timing of $D(n-N/2)$ from the zero-cross point and the polarity of $D(n-N/2)$ depends on the polarity change direction for the amount of one-symbol time. Therefore, the signal polarity change detector 21 can control the selector 242 such that one of $D(n-N/2)$ and $-D(n-N/2)$ is selected as the feedback value of the PLL circuit based on the polarity change direction information, where $-D(n-N/2)$ is obtained through an inverter 241 which inverts $D(n-N/2)$. That is, when the polarity changes from positive to negative, the output, $-D(n-N/2)$, of the inverter 241 is selected (steps S4), and when the polarity changes from negative to positive, the output, $D(n-N/2)$, of the ½-symbol delay circuit 23 is selected (steps S4).

No polarity change in step S1 means that there is no zero-cross point between symbols. In this case, the selector 242 is controlled to make the feedback value zero, to fix the sampling clock (step S3).

The feedback value selected by the selector 242 is input to the VCO 26 through a loop filter 25. The output of the VCO 26 can be taken as a clock signal which is synchronized with the symbol clock. Therefore, a clock recovery feedback system can be made by using the clock signal as a sampling clock.

However, in such a clock recovery circuit, clock recovery cannot be carried out accurately in a π/4 shift QPSK modulation system.

Figure 3:
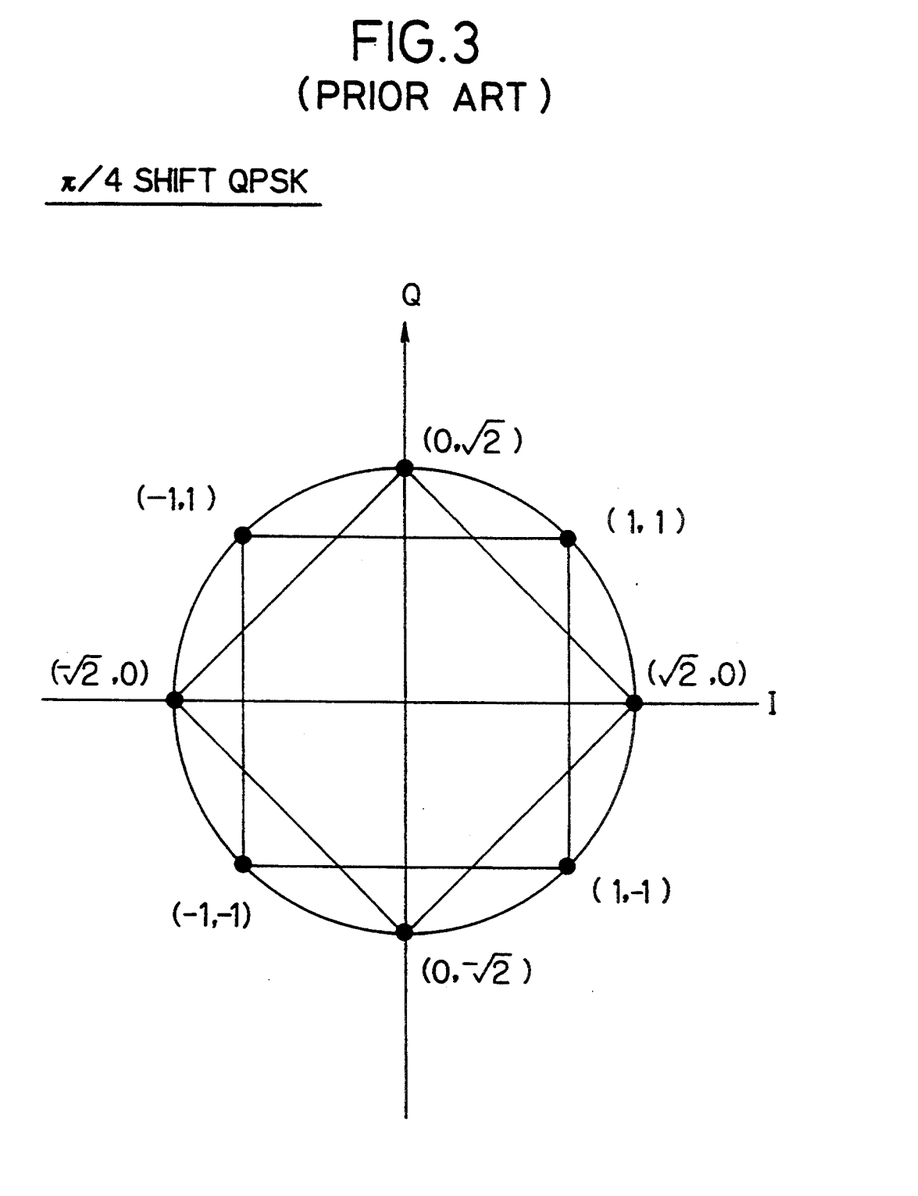
FIG. 3 is a constellation of $\pi/4$ shift QPSK modulation system.

The π/4 shift QPSK is a kind of QPSK system but having the same constellation as the 8-phase PSK system, as shown in FIG. 3. For example, in cases where a bit stream to be transmitted is $x_0, x_1, \ldots, X_{n-2}, X_{n-1}$ (where n is an even number), a symbol stream is constructed with pairs of bits, such as $(x_0, x_1), (x_2, x_3), \ldots, (x_{n-2}, x_{n-1})$. Here, the bits which are transmitted first in respective symbols are regarded as the I channel and the other bits as the Q channel. In the QPSK modulation, the symbols are mapped to $(1, 1), (-1, 1), (-1, -1)$, and $(1, -1)$. On the other hand, in π/4 shift QPSK modulation, the odd symbols are mapped to $(1, 1), (-1, 1), (-1, -1)$, and $(1, -1)$, and the even symbols are shifted by π/4 to be mapped to $(0, \sqrt{2}), (-\sqrt{2}, 0), (0, -\sqrt{2})$, and $(\sqrt{2}, 0)$. In shifting by π/4, the method of shifting each symbol by $+\pi/4$ may be employed.

Since the odd symbol phase is shifted by π/4 in the π/4 shift QPSK modulation, it is reverse-shifted by π/4 in the π/4 shift QPSK demodulation. In cases where there is a polarity change between the demodulated symbols, the ½-symbol prior value deviates from the zero-cross point by π/8 in phase compared to that in the QPSK. Moreover, the direction of this phase deviation depends on the transition of the signal state as well. Therefore, the accurate clock recovery cannot be achieved by using the ½-symbol prior value which is estimated to be a near-zero value when there was a polarity change between the demodulated symbols.

An object of the present invention is to provide a clock recovery circuit which can achieve accurate clock recovery in the π/4 shift QPSK demodulator.

SUMMARY OF THE INVENTION

A clock recovery circuit is comprised of a feedback system in a π/4 shift QPSK demodulator. The demodulator provides the clock recovery circuit with a detected baseband signal and a demodulated baseband signal. The detected baseband signal is QPSK detected from an input π/4 shift QPSK modulated wave, and the demodulated baseband signal is formed from the detected baseband signal by π/4 reverse shifting.

In the clock recovery circuit, a signal state transition detector detects state transitions between consecutive symbols of the demodulated baseband signal. According to degree of the detected symbol state transition, the ½-symbol delayed baseband signal which is formed by delaying the detected baseband signal by ½ symbol is shifted by the amount of π/8 in phase. According to direction of the detected symbol state transition, the π/8 phase shifted baseband signal is converted into an error signal in use for the feedback system. An oscillator generates a clock signal of a frequency controlled by the error signal such that the error signal is reduced in the feedback system.

The transition detector detects the state transition by comparing the second baseband signal with the baseband signal delayed by one symbol in units of symbol.

The $\pi/8$ phase shifting is preferably performed by a $+\pi/8$ phase shifter, a $-\pi/8$ phase shifter, and a selector. The selector selects one of the outputs of the $+\pi/8$ phase shifter and the $-\pi/8$ phase shifter according to the degree of said detected symbol state transition.

Preferably, the degree of the symbol state transition is Hamming distance. The phase shift selector is operated such that it selects the output of the $+\pi/8$ phase shifter when the Hamming distance is equal to 1, and selects the output of the $-\pi/8$ phase shifter when the Hamming distance is greater than 1.

A zero value is selected as an error signal when no state transition occurs in the demodulated baseband signal. One of the output and the inverted output of the $\pi/8$ phase shifters is selected as an error signal according to direction of the detected symbol state transition.

DETAILED DESCRIPTION OF THE PREFERRED EMBODIMENTS

The embodiment of the present invention will be explained hereinafter with reference to the drawings.

Figure 4:
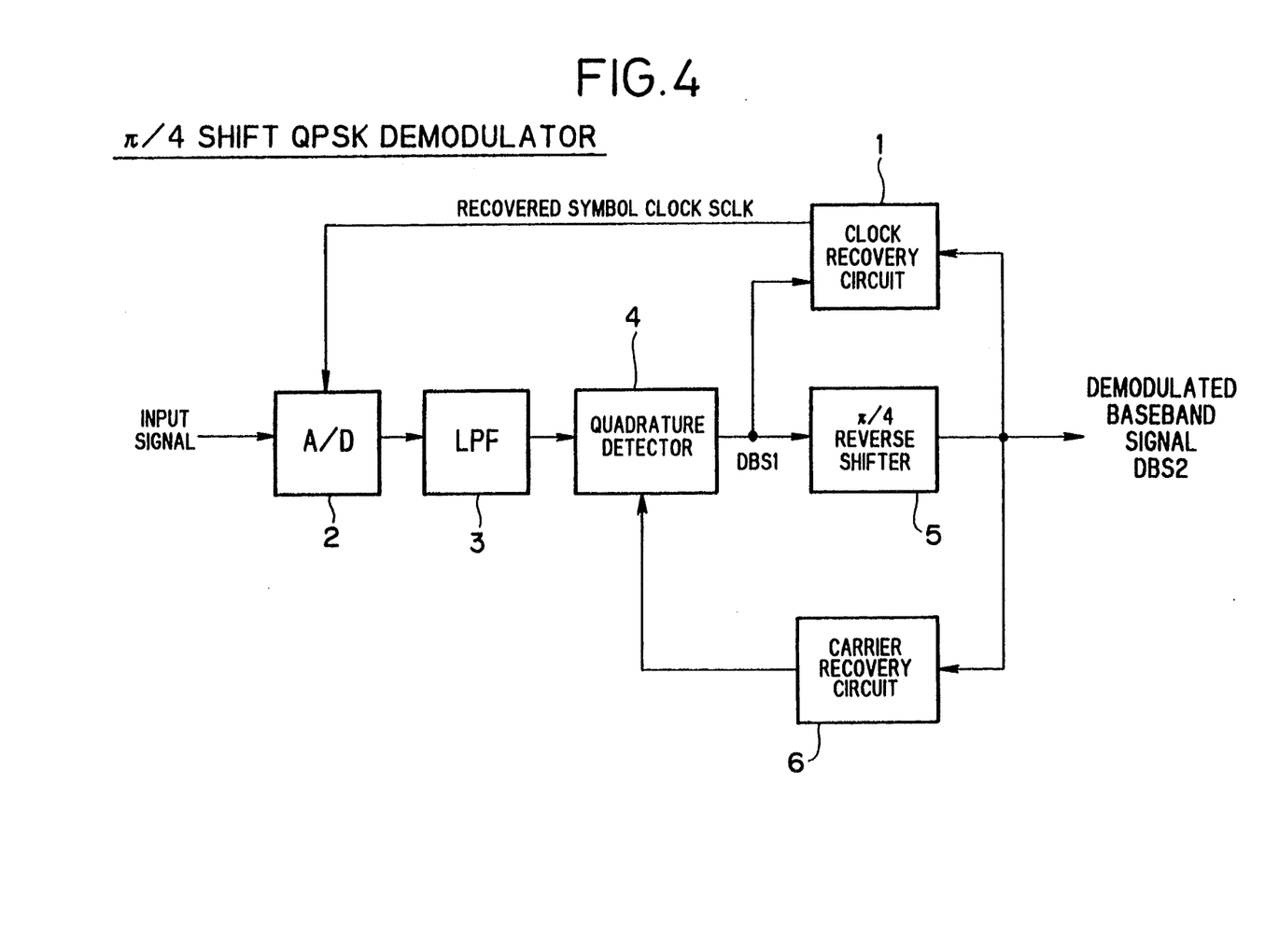
FIG. 4 is a block diagram illustrating an example of the $\pi/4$ shift QPSK demodulator to which the invention can be applied.

First, a digital demodulator to which the invention can be applied will be explained briefly. FIG. 4 shows an example of the $\pi/4$ shift QPSK demodulator using a clock recovery circuit according to the invention. For simplification, the I ch and Q ch are expressed together with one line.

In the $\pi/4$ shift QPSK demodulator, an input signal is provided to the quadrature detector 4 through the analog-to-digital (A/D) converter 2 and the low-pass filter (LPF) 3. Here, the input signal is a quasi-coherent signal output from a quasi-coherent detector (not shown). The quadrature detector 4 converts the digital input signal to a baseband signal DBS1, which is output to the clock recovery circuit 1 of the invention. The baseband signal DBS1 is also output to the $\pi/4$ reverse shift circuit 5 where the signal DBS1 is reverse-shifted by a phase of $\pi/4$, and the demodulated baseband signal DBS2 is obtained.

The clock recovery circuit 1 according to the invention is provided with the baseband signals DBS1 and DBS2 and recovers the symbol clock signal SCLK which is then supplied to the A/D converter 2 as a sampling clock to form a feedback system. Moreover, the baseband signal DBS2 is also output to the carrier recovery circuit 6 where the carrier signal is reproduced. The carrier signal is provided to the quadrature detector 4 in use for coherent detection.

CLOCK RECOVERY CIRCUIT

Figure 5:
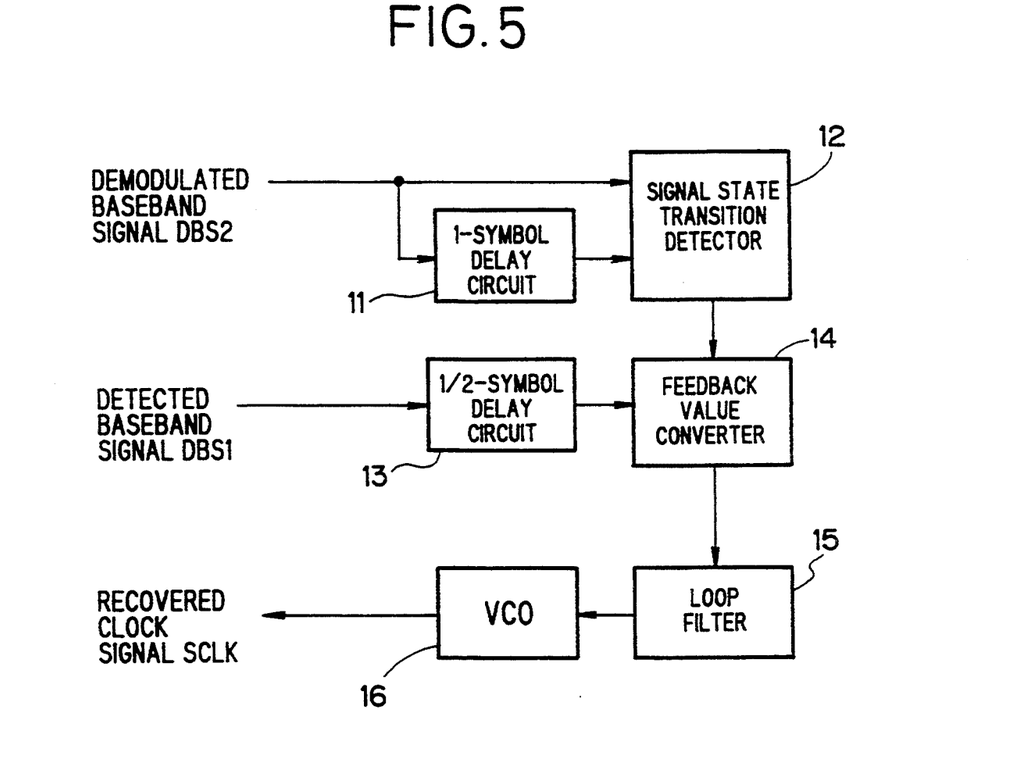
FIG. 5 is a schematic block diagram illustrating the clock recovery circuit according to an embodiment of the invention.

Referring to FIG. 5, a 1-symbol delay circuit 11 delays the demodulated baseband signal DBS2 by one symbol clock, and a signal state transition detector 12 detects the state transition of the demodulated baseband signal DBS2 by using the demodulated baseband signal DBS2 and the output of the 1-symbol delay circuit 11. A ½-symbol delay circuit 13 delays the baseband signal DBS1 by ½ symbol clock to output it to a feedback value converter 14. The feedback value converter 14 converts the output of the ½-symbol delay circuit 13 into a feedback value according to the output of the signal state transition detector 12. The feedback value is provided to a VCO 16 through a loop filter 15. Receiving the feedback value as a control signal, the VCO 16 generates a clock signal SCLK synchronized with the symbol clock.

When a signal state transition is detected by the signal state transition detector 12, the feedback value converter 14 shifts and inverts the ½-symbol prior value appropriately. Furthermore, the feedback value converter 14 selects a channel to feed back. If there is no signal state transition, the feedback value is regarded as zero. As described later, such an operation of the feedback value converter 14 allows the ½-symbol prior value of the ½-symbol delay circuit 13 to be handled similarly to the ½-symbol prior value in the QPSK as described in FIG. 1. In more detail, the output of the feedback value converter 14 inputting the value ½-symbol prior to the detection time of signal state transition can be handled similarly to the value ½-symbol prior to the time of signal polarity change in the QPSK system. Therefore, the VCO 16 generates a clock signal which is synchronized with the symbol clock.

Figure 6:
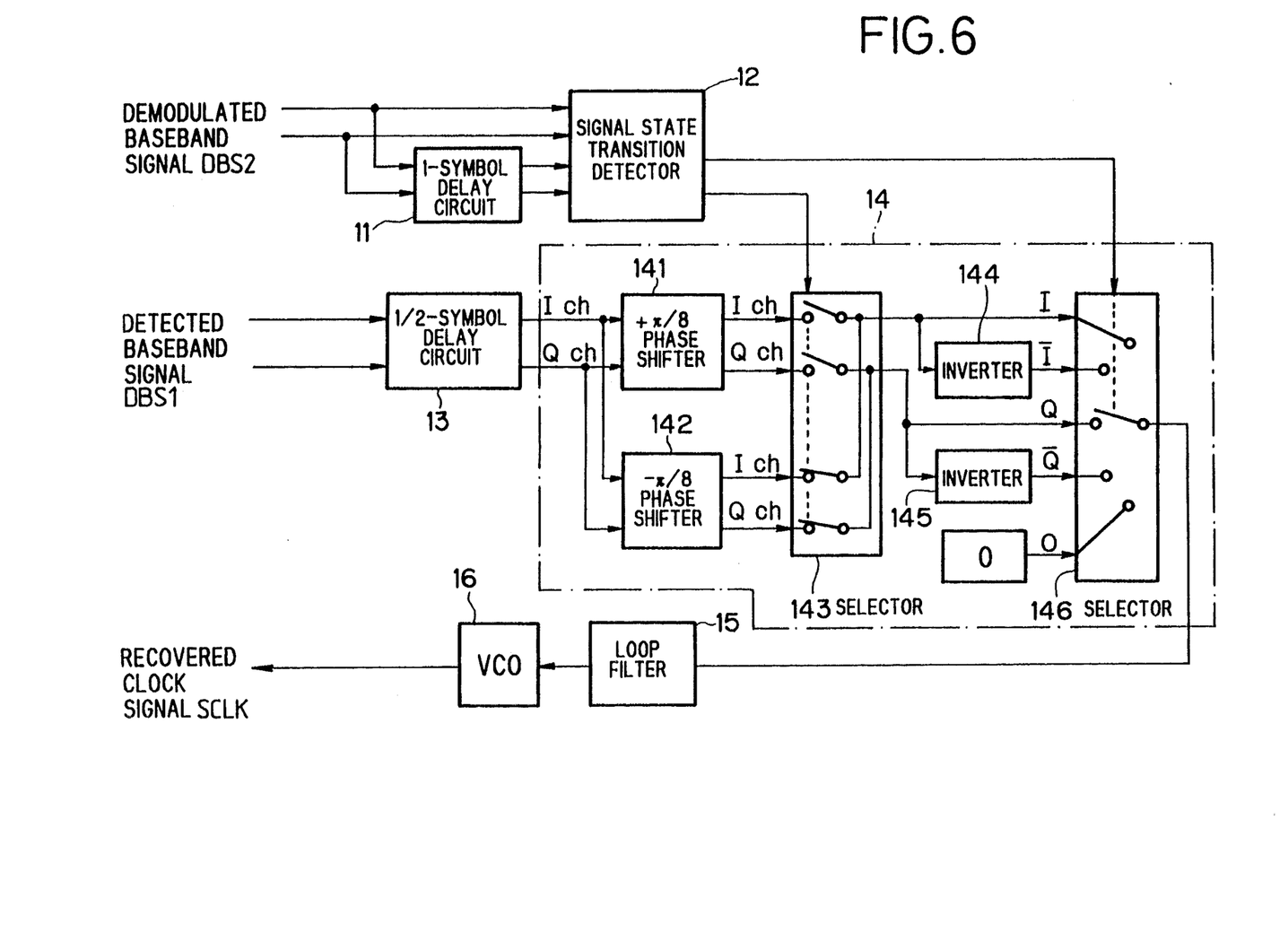
FIG. 6 is a block diagram illustrating the details of the feedback value converter in the embodiment of FIG. 5.

As shown in FIG. 6, in the feedback value converter 14, the respective input terminals of a $+\pi/8$ phase shifter 141 and a $-\pi/8$ phase shifter 142 are connected to the output terminal (I channel and Q channel) of the ½-symbol delay circuit 13, and their respective output terminals are connected to the input terminals of a selector 143. The selector 143 is controlled by the signal state transition detector 12 such that it can select either the output (I ch and Q ch) of the $+\pi/8$ phase shifter 141 or the output (I ch and Q ch) of the $-\pi/8$ phase shifter 142. The I-ch output terminal of the selector 143 is connected to a inverter 144 as well as a selector 146, and the Q-ch output terminal of the selector 143 is connected to a inverter 145 as well as the selector 146. A selector 146 is controlled by the signal state transition detector 12 such that it can select one of the I-ch output of the selector 143, the output of the inverter 144, the Q-ch output of the selector 143, the output of the inverter 145, and the value 0. The selected value is input to the VCO 16 through the loop filter 15 as a feedback value.

OPERATION

Figure 7:
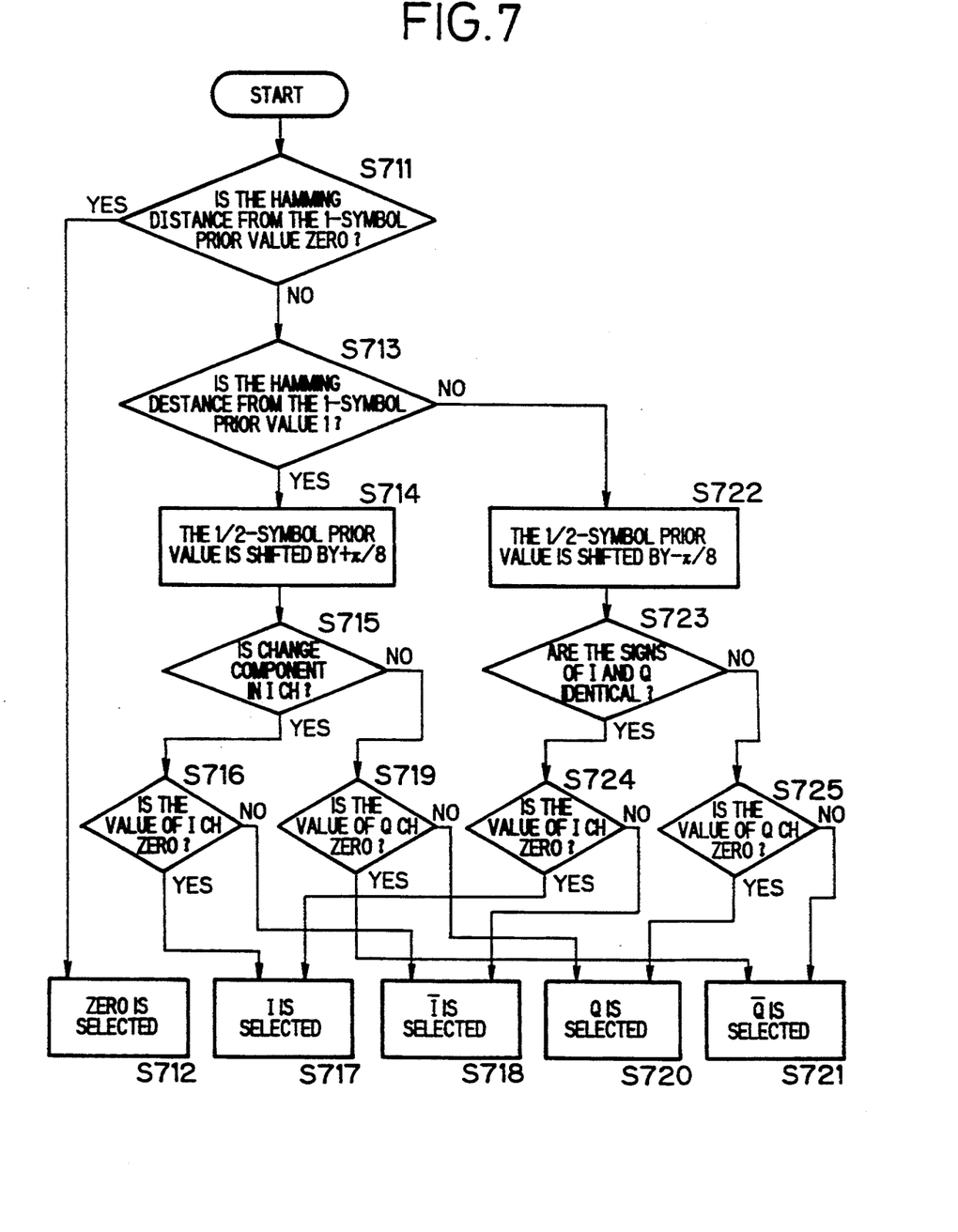
FIG. 7 is a flowchart showing the operation of the signal state transition detector and the feedback value converter in the embodiment according to the invention.

The operation of the signal state transition detector 12 and the feedback value converter 14 is explained referring to the flowchart in FIG. 7.

First, in step S711, it is determined whether the hamming distance between the present value and the 1-symbol prior value of the baseband signal DBS2 is zero "0". If the hamming distance is 0, the selector 146 is caused to select 0 to fix the frequency of the clock SCLK (step S712). When it is detected that the hamming distance from the 1-symbol prior value is not 0, it is determined whether the hamming distance from the 1-symbol prior value is 1 (step S713). If the hamming distance from the 1-symbol prior value is 1, the selector 143 selects the ½-symbol prior value output from the $+\pi/8$ phase shifter 141 (step S714).

Next, it is determined whether a change of value occurs in I ch (step S715). If the change occurs in I ch, it is determined whether the value of the I ch is 0 (step S716). If the value of I ch is 0, the selector 146 is caused to select the I-ch output of the selector 143 (step S717). If the value of I ch is not 0, the selector 146 is caused to select the output of the inverter 144 (step S718).

In step S715, if it is determined that no change occurs in I ch, it is determined whether the value of Q ch is 0 (step S719). If the value of Q ch is 0, the selector 146 is caused to select the output of the inverter 144 (step S718). If the value of Q ch is 0, the selector 146 is caused to select the Q-ch output of the selector 143 (step S720).

In the step 713, if it is determined that the hamming distance from the 1-symbol prior value is not 1, the selector 143 selects the output of the $-\pi/8$ phase shifter 142 (step S722), and it is determined whether the signs of I and Q are identical (step S723). If it is determined that the signs of I and Q are identical, it is determined whether the value of I ch is 0 (step S724). If the value of I ch is 0, the selector 146 is caused to select the I-ch output of the selector 143 (step S717). If the value of I ch is not 0, the selector 146 is caused to select the output of the inverter 144 (step S718).

In step S723, if it is determined that the signs of I and Q are not identical, it is determined whether the value of Q ch is 0 (step S725). If it is determined that the value of Q ch is 0, the selector 146 is caused to select the Q-ch output of the selector 143 (step S720). If it is determined that the value of Q ch is not 0, the selector 146 is caused to select the output of the inverter 145 (step S721).

By the above operation, the ½-symbol prior value can be made a near-zero value equivalently in the $\pi/4$ shift QPSK demodulator as well. Clock recovery can be made by feeding back the output value of the selector 146 to the VCO 16 to control the sampling clock. Moreover, if there is no signal state transition, the feedback value is regarded as zero and the sampling clock is fixed.

As described above, according to the invention, a clock signal can be recovered accurately in the $\pi/4$ shift QPSK demodulator by detecting the signal state transition of the demodulated baseband signal DBS2, converting the ½-symbol prior value to a feedback value for the clock recovery feedback system according to the detected signal state transition, and generating a clock signal SCLK according to the feedback value.

What is claimed is:

1. Clock recovery circuit comprising a feedback system in a $\pi/4$ shift QPSK (Quadriphase Phase Shift Keying) demodulator, said demodulator providing said clock recovery circuit with a first baseband signal which is QPSK detected from an input $\pi/4$ shift QPSK modulated wave and a second baseband signal which is formed from said first baseband signal by $\pi/4$ reverse shifting, said clock recovery circuit comprising:

transition detecting means for detecting state transitions between consecutive symbols of said second baseband signal and for producing a detected symbol state transition;

delaying means for delaying said first baseband signal by a half symbol to produce a half-symbol delayed baseband signal;

phase shifting means for producing an output by shifting said half-symbol delayed baseband signal by a phase shift amount of $\pi/8$ according to a magnitude of said detected symbol state transition;

converting means for converting the output of said phase shifting means into an error signal in use for said feedback system according to a direction of said detected symbol state transition; and oscillation means for generating a clock signal of a frequency controlled by said error signal such that said error signal is reduced in said feedback system.

2. Clock recovery circuit as set forth in claim 1, wherein said transition detecting means detects said detected symbol state transition by comparing said second baseband signal with a version of the first baseband signal which has been delayed by one symbol.

3. Clock recovery circuit as set forth in claim 1, wherein said phase shifting means is comprised of:

a $+\pi/8$ phase shifter for producing an output by shifting said half-symbol delayed baseband signal by $+\pi/8$;

a $-\pi/8$ phase shifter for producing an output by shifting said half-symbol delayed baseband signal by $-\pi/8$; and a selector for selecting one or the other of the output of said $+\pi/8$ phase shifter and the output of said $-\pi/8$ phase shifter according to said magnitude of said detected symbol state transition.

4. Clock recovery circuit as set forth in claim 1, wherein said magnitude of said symbol state transition is Hamming distance.

5. Clock recovery circuit as set forth in claim 3, wherein said magnitude of said symbol state transition is Hamming distance.

6. Clock recovery circuit as set forth in claim 5, wherein said selector selects the output of said $+\pi/8$ phase shifter when said Hamming distance is equal to 1, and selects the output of said $-\pi/8$ phase shifter when said Hamming distance is greater than 1.

7. Clock recovery circuit as set forth in claim 1, wherein said converting means generates a zero value as said error signal when no state transition occurs.

8. Clock recovery circuit as set forth in claim 1, wherein said phase shifting means also produces an inverted output of said output and wherein said converting means comprises a selector for selecting either the output or the inverted output of said phase shifting means according to a direction of said detected symbol state transition.

9. Clock recovery circuit as set forth in claim 8, wherein said selector further selects a zero value as said error signal when no state transition occurs.

* * * * *